United States Patent Office 2,880,198
Patented Mar. 31, 1959

2,880,198

POLYMERIZATION OF OLEFINS

William C. Lanning, Bartlesville, Okla., assignor to Phillips Petroleum Company, a corporation of Delaware No Drawing. Application April 13, 1953
Serial No. 348,567

7 Claims. (Cl. 260—93.7)

This invention relates to the catalytic polymerization of olefins to tacky, or semi-solid, to solid polymer. A specific aspect of the invention is concerned with the polymerization of certain 1-olefins to tacky, or semi-solid, to solid polymer over chromium oxide-silica-alumina type catalyst.

Application Serial No. 333,576, now abandoned, of J. P. Hogan et al., filed January 27, 1953, discloses a novel process for manufacturing tacky, or semi-solid, to solid polymer by contacting certain 1-olefins with a catalyst comprising chromium oxide deposited on silica and/or alumina. It has been found that when effecting this process over a fixed-bed catalyst the heaviest polymer is formed on the catalyst in that portion of the bed adjacent the influent end where the temperatures are lowest. A substantial portion of the heavy polymer adheres to the catalyst and gradually, over a period of 2 to 10 hours, deactivates the catalyst in the influent end of the bed so that the catalyst in this portion of the bed, at least, requires regeneration. This relatively rapid deactivation of the catalyst due to accumulation of heavy polymer thereon is a serious problem to continuous operation of a fixed-bed catalyst process.

The principal object of the invention is to provide an improved process for continuously producing tacky to solid polymer over a fixed-bed catalyst. Another object of the invention is to provide a simple method of removing polymer deposition on the catalyst in a fixed-bed polymerization process without discontinuing the polymerization process. A further object of the invention is to increase the life of a chromium oxide polymerization catalyst in a fixed-bed process. Other objects of the invention will become apparent from a consideration of the accompanying disclosure.

The temperature used in carrying out the reaction depends to some extent on other operating conditions, such as the particular solvent used, but normally ranges from 100 to 300° F., with a preferred range of 170 to 225° F. At higher or lower temperatures conversion usually decreased and rate of catalyst deactivation increased. The pressure should be high enough to maintain substantially a liquid phase. Usually the pressure is maintained around 600 pounds per square inch but higher and lower pressures sufficient to maintain liquid phase are feasible. The feed rate may range from 0.1 to 20 liquid hourly space velocity with a preferred rate in the range of 1 to 4 liquid hourly space velocity. Hydrocarbon diluents, preferably paraffins, serve as solvents for the polymer products to aid in the removal of the product from the catalyst and the reactor. Diluents that may be used are propane, n-butane, isobutane, n-pentane, isopentane, and isooctane also paraffins and olefins up to $C_{12}$ or higher. The higher paraffinic diluents give better results, probably because they are better solvents for the polymer. The flushing of catalyst with isooctane alone at 190° F. does not remove the least soluble fraction of heavy polymer at an appreciable rate.

I have discovered that when using a fixed-bed of chromium oxide-silica-alumina catalyst for a polymerization reaction this adverse effect of heavy polymer accumulation can be avoided by periodically reversing the direction of flow of the olefin feed through the bed of catalyst. In my process the flow of olefin feed through the catalyst bed is continued in one direction until the portion of the catalyst at the influent end of the bed becomes substantially deactivated by accumulation of heavy polymer thereon. The flow of olefin feed through the bed is then reversed without any change in pressure. The olefin feed is introduced at a temperature of 160 to 190° F., the olefin concentration being such as to cause the temperature rise through the reactor to be about 40 to 90° F. The desired heavier polymer is produced at the lower temperature influent end of the bed and accumulates on the catalyst because of its low solubility in the diluent or solvent, e.g., isooctane. At desired intervals the flow is reversed. The catalyst on which the heavy polymer has accumulated is now near the effluent end and its temperature is raised by the heat of reaction. The heavy polymer is thus flushed off at the higher temperature while catalyst in the influent end of the bed is being cooled by the fresh feed being introduced and is producing the desired heavy polymer. The frequency of reversal and temperature limits being permitted during each part of the cycle may be varied somewhat to obtain optimum operation. The direction of flow of feed is reversed at intervals varying from about 2 to about 10 hours.

The following specific examples illustrate the invention and its effectiveness in maintaining continuously active catalyst in fixed-bed operation.

Example I

A run was made in which propylene was polymerized under the following conditions:

| | |
|---|---|
| Feed | 5 volume percent propylene, 5 volume percent propane and 90 volume percent isooctane. |
| Catalyst | Chromium oxide-silica-alumina manufactured and activated at 950° F., in accordance with the invention of application Serial No. 333,576 referred to earlier. |
| Pressure | 600 lbs. per sq. in. |
| Reaction temperature | 180 to 190° F. |
| Results | Conversion in first 5 hours was over 90 percent. The conversion dropped in a 20 hour run to less than 50 percent, with the catalyst being partly broken up by polymer accumulation. |

Flushing of catalyst with isooctane alone at 190° F. did not remove the least soluble fraction of polymer at an appreciable rate. Flushing temperature was then raised to 230 to 250° F. The heavy polymer was rapidly removed. The solubility of the heavy polymer in isooctane increased very sharply in this temperature range. The catalyst thus flushed relatively free of polymer was observed to be partly disintegrated.

Example II

Same as Example I except the reaction temperature was 220 to 250° F. instead of 180 to 190° F. Average conversion in a 20-hour run was considerably higher than in Example I and mechanical breakdown of catalyst was not observed. The polymer product, however, was of lower molecular weight than in Example I and is less desirable for some uses.

NOTE.—If the reaction temperature is raised above 250° F., the rate of deactivation of catalyst becomes excessive. This places an upper limit on the reaction temperature for some purposes.

Example III

In a run with the same catalyst as used in the previous examples in an essentially adiabatic reactor, in which temperature rises in the direction of flow of feed, the direction of flow is reversed at intervals in the range of 2 to 10 hours. The feed is introduced at a temperature of 160 to 190° F., the olefin concentration being such as to limit the temperature rise through the reactor to the range of 40 to 90° F. at the conversion level obtained. A portion of the desired heavier polymer produced at the lower temperature existing in the influent end of the reactor accumulates on the catalyst because of its low solubility. At desired intervals, the flow is reversed. The portion of the catalyst on which the heavy polymer accumulates is now nearer the effluent end, with its temperature being raised by the heat of reaction. The heavy polymer is thus flushed off at the higher temperature, while catalyst near what is now the influent end is cooled by the fresh feed being introduced and produces the desired heavy polymer. The properties of the total polymer are intermediate those of the polymer produced in Examples I and II.

It will be appreciated by those skilled in the art that the foregoing examples merely illustrate the invention and that the same should not serve to unnecessarily limit or restrict the invention. Various modifications of the disclosed invention may be practiced without departing from the spirit and scope of the same.

I claim:

1. In a process in which an olefin, diluted with a liquid hydrocarbon solvent, is polymerized by contacting with a fixed bed of solid catalyst and product polymer deposits on the catalyst in an upstream part of said bed, the improvement which comprises maintaining the polymerization per pass sufficiently high to effect a substantial progressive increase in the temperature of the reaction mixture in the direction of flow, as a result of exothermic heat of polymerization, said solvent at the increased temperature having substantial solvent power for the deposited polymer, and reversing the direction of flow through said bed when a substantial amount of said polymer has accumulated on said upstream part of said bed.

2. The process of claim 1 in which the feed inlet temperature is maintained in the range of 100 to 210° F. and the temperature rise through the bed is maintained in the range of 40 to 90° F.

3. The process of claim 1 in which isooctane is utilized as diluent.

4. The process of claim 1 in which the diluent is a paraffin hydrocarbon of 3 to 12 carbon atoms per molecule.

5. The process of claim 1 in which the feed comprises ethylene.

6. The process of claim 1 in which the feed comprises propylene.

7. The process of claim 1 in which the feed comprises butylene.

References Cited in the file of this patent
UNITED STATES PATENTS

| Number | Name | Date |
|---|---|---|
| 2,313,661 | Montgomery | Mar. 9, 1943 |
| 2,324,746 | Weinrich | July 20, 1943 |
| 2,404,788 | Burk | July 30, 1945 |
| 2,691,647 | Field et al. | Oct. 12, 1954 |
| 2,692,261 | Peters et al. | Oct. 19, 1954 |